Dec. 29, 1936.  C. F. WARRICK  2,065,634
ELECTRICAL RELAY SYSTEM
Filed Nov. 30, 1934

INVENTOR.
CHARLES F. WARRICK
BY
Barnes, Kisselle, Laughlin & Raisch
ATTORNEYS.

Patented Dec. 29, 1936

2,065,634

UNITED STATES PATENT OFFICE 2,065,634

ELECTRICAL RELAY SYSTEM

Charles F. Warrick, Detroit, Mich.

Application November 30, 1934, Serial No. 755,395

4 Claims. (Cl. 175—320)

This invention relates to an electrical relay system useful in connection with boilers or other devices where water or other liquid is required to be held at a certain level or within a range of levels.

According to the invention, a circuit is provided which, in case the level of a body of water is to be a controlling factor, includes an electrode arrangement where the circuit is opened and closed in accordance with liquid levels to control a movable element such as an armature for making and breaking another circuit. In order to have in said circuit the necessary voltage so that there will be current across the electrodes sufficient to exert a controlling action on the armature, the invention contemplates an electrical circuit arrangement wherein a transformer is used to thus obtain the desired voltage. The invention also aims to provide an electrical circuit wherein other controlling means such as a thermostat may be used, and wherein the thermostat is in a low voltage circuit and the electrode in a high voltage circuit. The invention and its objects will be better understood by the following detailed description and the accompanying drawing:

Figure 1:
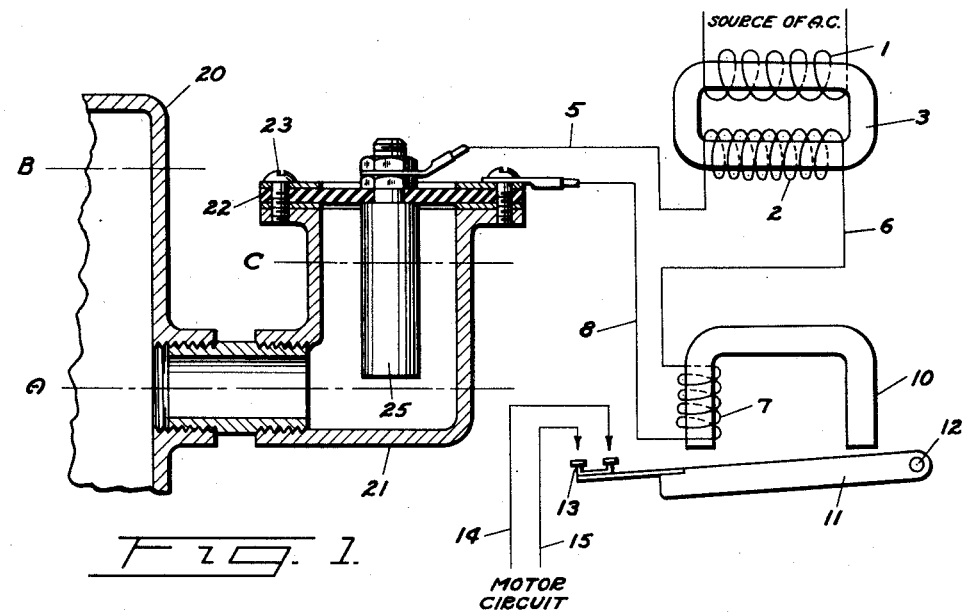
Fig. 1 is a diagrammatic illustration of an electrical layout illustrating one form of the invention.

A device constructed in accordance with the invention may comprise a transformer having primary windings 1, which is to be connected to a suitable source of alternating current, as for example the ordinary house lighting system, and a secondary 2, the two coils being provided with a suitable core 3. As shown herein the transformer is of the step-up type, so that the voltage in the secondary is higher than that in the primary. The secondary coil is in a circuit as follows: A conductor 5 from one end of the coil runs to an electrode as shown. A conductor 6 from the opposite end of the secondary coil 2 connects into coil 7 of a relay, and a conductor 8 leads from the opposite end of coil 7 and connects to what amounts to an electrode, with the electrical circuit across 5 and 8 to be made by water or other liquid.

The relay may comprise a core 10 and an armature 11 which may be pivoted at 12. When the secondary circuit is closed the armature is attracted magnetically and swings toward the poles of the core 10 and when the secondary circuit is open the armature moves away from the poles to the position as shown in Fig. 1. This movement of the armature is to be utilized as a control for any suitable apparatus with its movement depending upon the presence of liquid for bridging the electrodes. To this end the armature may be provided with a contact device 13 for closing a circuit illustrated by the conductors 14 and 15.

This electrical arrangement may be used in connection with an oil burning heating system, and the conductors 14 and 15 may be a motor circuit. The particular electrode arrangement as shown is covered in another application and but a brief description herein will suffice. The boiler is shown at 20 to which a fixture 21 is secured as shown. The fixture is closed at the bottom and open at the top. However, the fixture is sealed closed at the top by an element such as disc 22, which may be secured to the fixture by cap screws or the like, as shown at 23, with the use of a suitable washer or gasket. The disc 22 is of an insulating material, such as bakelite, a rubber composition, or the like, and secured to the disc is an electrode 25 which depends into the fixture 21 and spaced from the walls thereof. The conductor 5 connects to the electrode and the conductor 8 is connected to the fixture 21 as by means being held by one of the screws 23. As long as the water in the boiler is at a level high enough to establish a connection across the electrode 25 to the fixture 21, the secondary circuit is closed and the armature held up toward the poles of the relay and the motor circuit is closed. As soon as the water level recedes to a point below the lower end of the electrode 25 the secondary circuit is broken and the armature falls away from the poles of the core 10 and breaks the motor circuit. The circuit is broken when the water level is at the dotted line "A". As the water level rises in the boiler it also rises in the fixture 21. The water in the boiler may go to a level higher than the top of the fixture 21; for example, it may go to the level shown at B, or higher; at this time the level of the water in the fixture, however, may only go to the level C, since the disc 22 seals the top of the fixture and air is trapped therein above the water in the fixture, and this air is compressed and keeps the water in the fixture from going as high as it may go in the boiler. However, this is merely to explain the operation of the device, and the particular electrode is not claimed herein.

In an oil burning, steam heating plant, the burner may be turned on and off by hand or automatically to obtain the desired temperature, and to this end the motor circuit 14 and 15 may be thus made and broken as long as the water level is such as to bridge the electrodes constituted by the electrode 25 and fixture 21. However, if the water level recedes, for example, to the level A, then the motor circuit may no longer be closed as it is broken and remains broken at the contact 19, and cannot be closed until the water level is raised. Thus there is no chance of ruining the boiler or other parts by having the burner turned on while there is insufficient water in the boiler.

Figure 2:
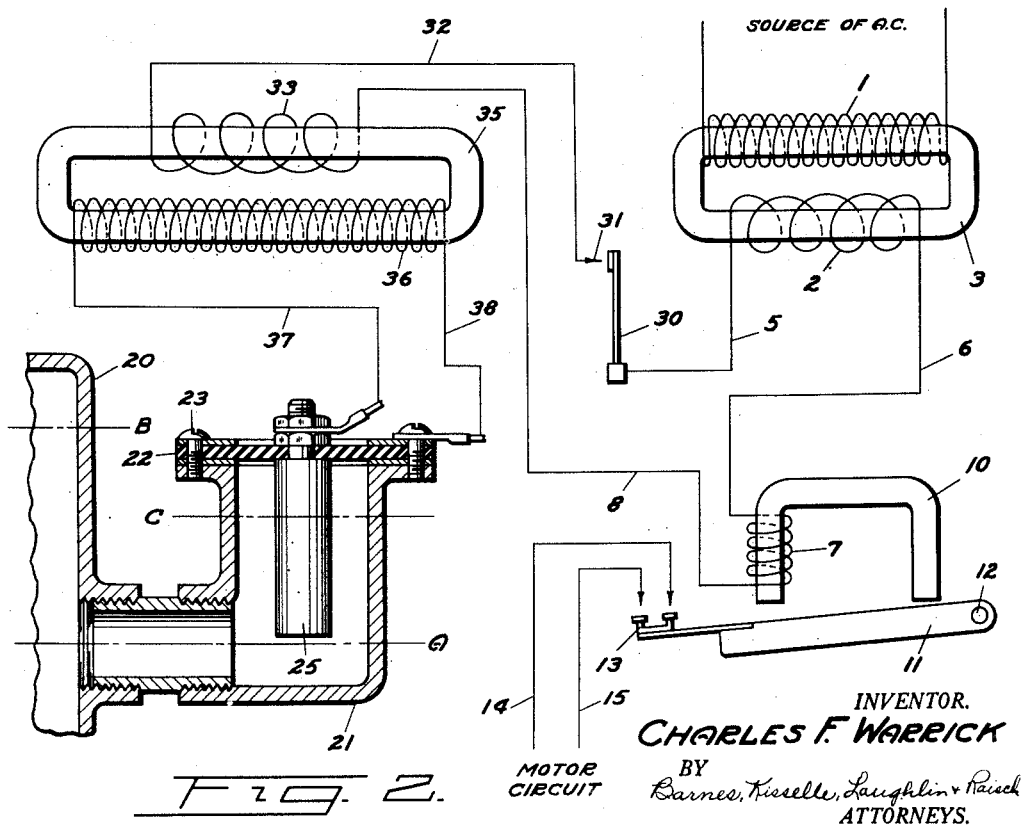
Fig. 2 is a diagrammatic layout illustrating a variation of the invention.

In Fig. 2 an arrangement is shown adapted for association with an oil burning, steam heating plant, and which arrangement incorporates a thermostatic control. In Fig. 2 the transformer, the relay, the motor circuit and the electrode arrangement are the same as that shown in Fig. 1, and the same reference characters are applied to these parts, and a second description is not necessary. The secondary circuit is substantially the same, except for the inclusion of a thermostat, and it has the same reference characters applied thereto as are applied in Fig. 1. The secondary circuit line 5 connects to a thermostat diagrammatically illustrated at 30, which is arranged to make and break contact with the contact member 31, which is connected to the primary coil 33 of a second transformer, which coil then connects with line 8. This transformer may have a suitable core 35 and a secondary winding 36 in a circuit constituted by conductors 37 and 38 leading respectively to the electrode 25 and fixture 21.

The arrangement shown in Fig. 2 operates as follows: Assuming that the water level is at a height to close the circuit for the secondary coil 36; as the thermostat 30 makes and breaks the circuit for the secondary coil 2 the relay functions and the motor circuit is closed upon attraction of the armature by the coil 7 when the contact at 31 is made, and the motor circuit is opened when the contact at 31 by the thermostat is broken. Thus the motor circuit, if it be for an oil burner, is made and broken in accordance with temperature conditions.

As long as the electrode circuit is closed there will be a sufficient current passing through the relay circuit to cause the coil 7 to attract the armature. However, if the water level recedes to a point where the electrode circuit is open, the coil 33 becomes in effect an impedance coil, and acts as a choke so that the coil 7 will not attract the armature 11, and thus the motor circuit cannot be closed; while on the other hand, if the motor circuit is closed and the water level is receding, as soon as the water level breaks the electrode circuit the armature will drop away from the poles of the core 10 and open the motor circuit.

With this arrangement low voltage may be employed in the relay circuit and this may be desirable because of the remote position of the thermostat, since the thermostat may be positioned remote from the other parts and in a room or other place where certain temperature ranges are to be maintained. Due to low voltage in the circuit the wiring system to and from the thermostat may be of a cheaper type than that which would be required with high voltage. In other words, for example, bell wire may be used to run to the thermostat, whereas with high voltage the wiring system would have to conform to the underwriters' code and comprise conduits for the wires or the like. However, by using the transformer between the relay circuit and electrode circuit, the voltage in the electrode circuit may be made sufficiently high to insure requisite current flow across the electrodes.

I claim:—

1. An electrical controlling system comprising, a transformer having its primary coil connected to a source of alternating current and having a secondary coil, a secondary circuit, a relay in the secondary circuit having a movable armature, a control circuit opened and closed by armature movements, a thermostat in the secondary circuit for opening and closing the same, a second transformer having its primary coil in said secondary circuit, and having a secondary coil, a circuit for the secondary coil of the second transformer, in combination with a container for water, electrode means in the secondary circuit of the second transformer projecting into water at high level and lying above the water at low level, whereby at high water level operation of the thermostat causes the relay to open and close the controlling circuit, and whereby at low water level the primary coil of the second transformer chokes the secondary circuit of the first transformer so that the current therein when said circuit is closed is insufficient to actuate the armature of the relay and the controlling circuit is open.

2. An electrical controlling system comprising, a transformer having its primary coil connected to a source of alternating current and having a secondary coil, a secondary circuit, a relay in the secondary circuit having a movable armature, a control circuit opened and closed by armature movements, a thermostat in the secondary circuit for opening and closing the same, a second transformer having its primary coil in the secondary circuit, and having a secondary coil, a circuit for the secondary coil of the second transformer, in combination with means for opening and closing the last mentioned circuit whereby the relay armature functions as the said thermostat opens and closes the first mentioned secondary circuit while the second mentioned secondary circuit is closed, and whereby the primary coil of the second transformer chokes the current flow in the first mentioned secondary circuit when the second mentioned secondary circuit is open, so that the armature of the relay does not respond to the opening or closing of the first mentioned secondary circuit by the thermostat.

3. An electrical control system comprising, a primary circuit connected to a source of alternating current, a secondary circuit, a step-down transformer between the circuits, whereby the secondary circuit is of low voltage, a relay in the secondary circuit having a movable armature, a controlling circuit arranged to be opened and closed by armature movements, a thermostat in the secondary circuit adapted to be positioned in a remote location for opening and closing the secondary circuit, a second transformer of the step-up type having its primary in the said secondary circuit, a circuit for the secondary windings of the said second transformer, electrode means associated with a body of water for closing the secondary circuit of the second transformer at high water level and for opening the same at low water level, the voltage in the secondary circuit of the second transformer being sufficiently high to cause a current to flow across the electrode means at high water level which is sufficient to cause the relay armature to move in response to the opening and closing of the thermostat in the first mentioned secondary circuit to open and close the controlling circuit, the primary coil of the second transformer serving to choke the first mentioned secondary circuit when the second mentioned secondary circuit is open so that the armature does not move in response to the thermostat and the controlling circuit is open.

4. An electrical controlling system comprising, a transformer having its primary coil connected to a source of alternating current and having a secondary coil, a secondary circuit, a solenoid in the secondary circuit, an armature movable thereby, means controlled by armature movement, a thermostat in the secondary circuit for opening and closing the same, a second transformer having its primary coil in said secondary circuit and having a secondary coil, a circuit for the secondary coil of the second transformer, in combination with a container for water, electrode means in the secondary circuit of the second transformer projecting into water at high level and lying above the water at low level, whereby at high water level operation of the thermostat causes the solenoid to actuate the armature, and whereby at low water level the primary coil of the second transformer chokes the secondary circuit of the first transformer so that the current therein, when said circuit is closed, is insufficient to cause the solenoid to actuate the armature.

CHARLES F. WARRICK.